United States Patent [19]

Mihalic

[11] 4,018,101
[45] Apr. 19, 1977

[54] POSITIONING DEVICE FOR ADJUSTABLE STEERING COLUMNS

[75] Inventor: William T. Mihalic, Southfield, Mich.

[73] Assignee: Eaton Corporation, Cleveland, Ohio

[22] Filed: Aug. 28, 1975

[21] Appl. No.: 608,414

[52] U.S. Cl. .................................. 74/493; 74/529; 248/286; 403/61

[51] Int. Cl.² ...................... B62D 1/18; G05G 5/24

[58] Field of Search .................. 74/493, 527, 529; 248/285, 286; 403/59, 61

[56] References Cited

UNITED STATES PATENTS

| | | | |
|---|---|---|---|
| 2,185,779 | 1/1940 | Tveidt | 74/493 |
| 3,307,420 | 3/1967 | Fisher | 74/493 |
| 3,533,302 | 10/1970 | Hansen | 74/493 |
| 3,678,778 | 7/1972 | Groves | 74/493 |
| 3,718,053 | 2/1973 | Cinadr | 74/493 |
| 3,724,290 | 4/1973 | Burton | 74/493 |
| 3,803,939 | 4/1974 | Schenten | 74/493 |

*Primary Examiner*—Allan D. Herrmann
*Attorney, Agent, or Firm*—Teagno & Toddy

[57] ABSTRACT

A positioning device for a vehicle steering column which includes a stationary support structure formed from a pair of spaced plates, a moveable member adapted for attachment to the column and slidably received between the plates for translational and pivotal movement with respect to them, a fixed guide pin and a floating guide pin engaged in cooperating slots in the moveable member to control translational and pivotal movement, latching elements operable to fix the moving member in any pivotal or translational position, and a control lever operative to disable the latching elements to allow movement and further operative to apply a transverse locking force to the plates when the moveable member is in any selected position.

18 Claims, 7 Drawing Figures

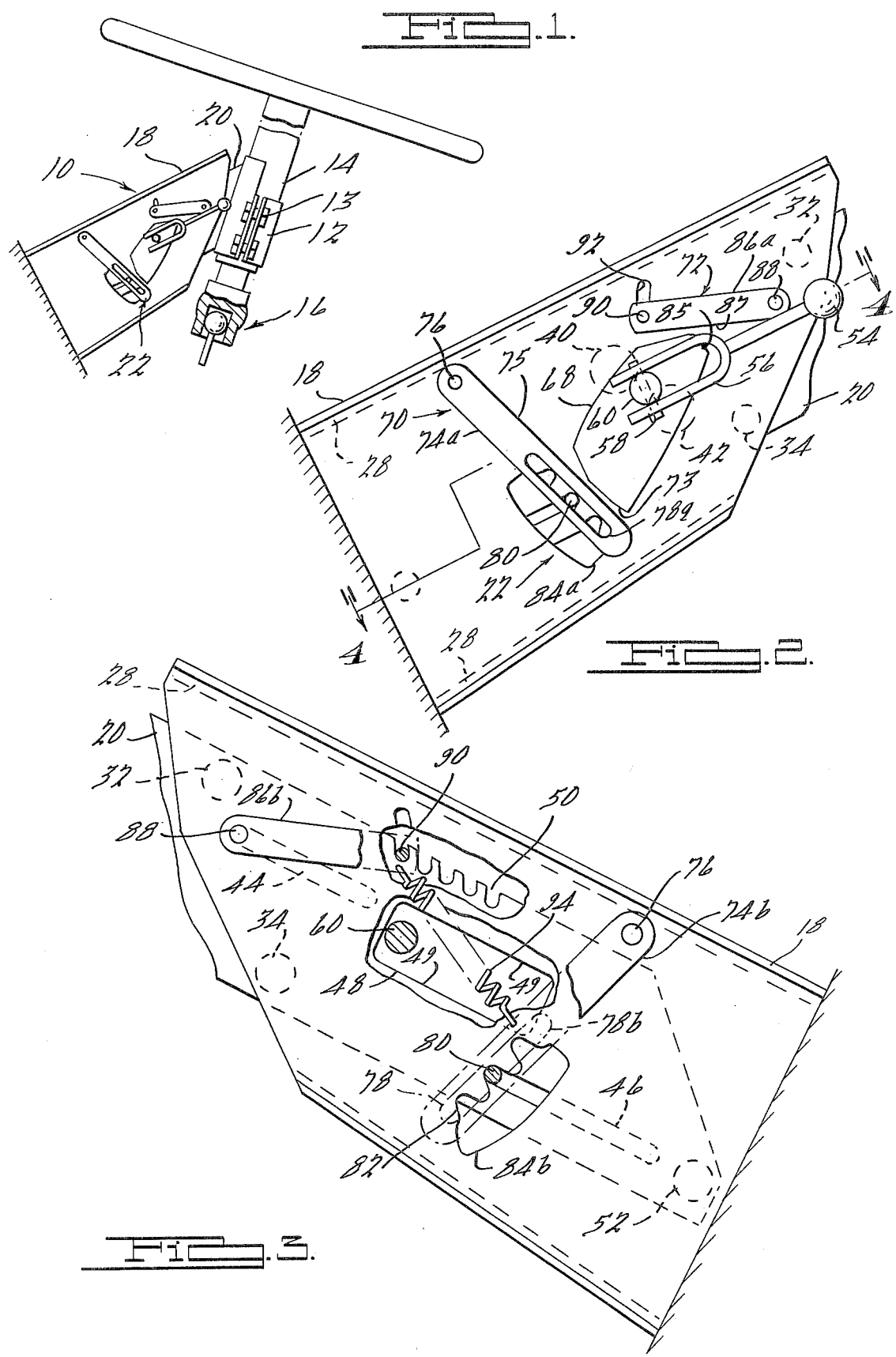

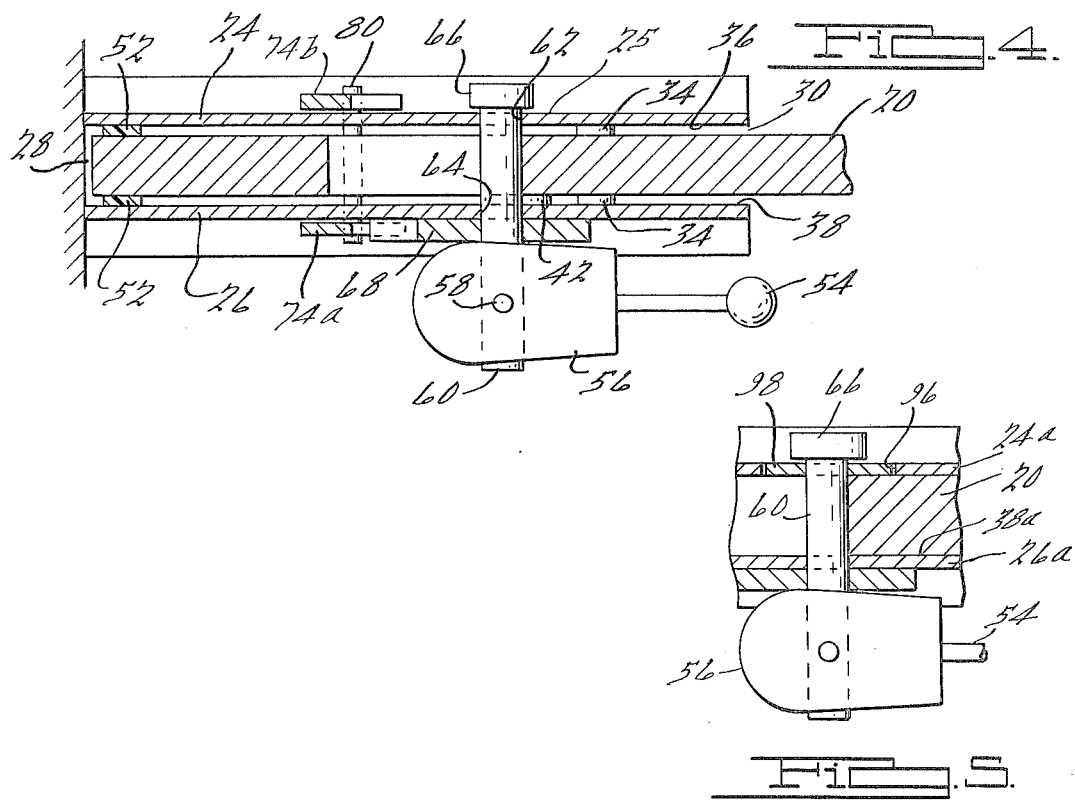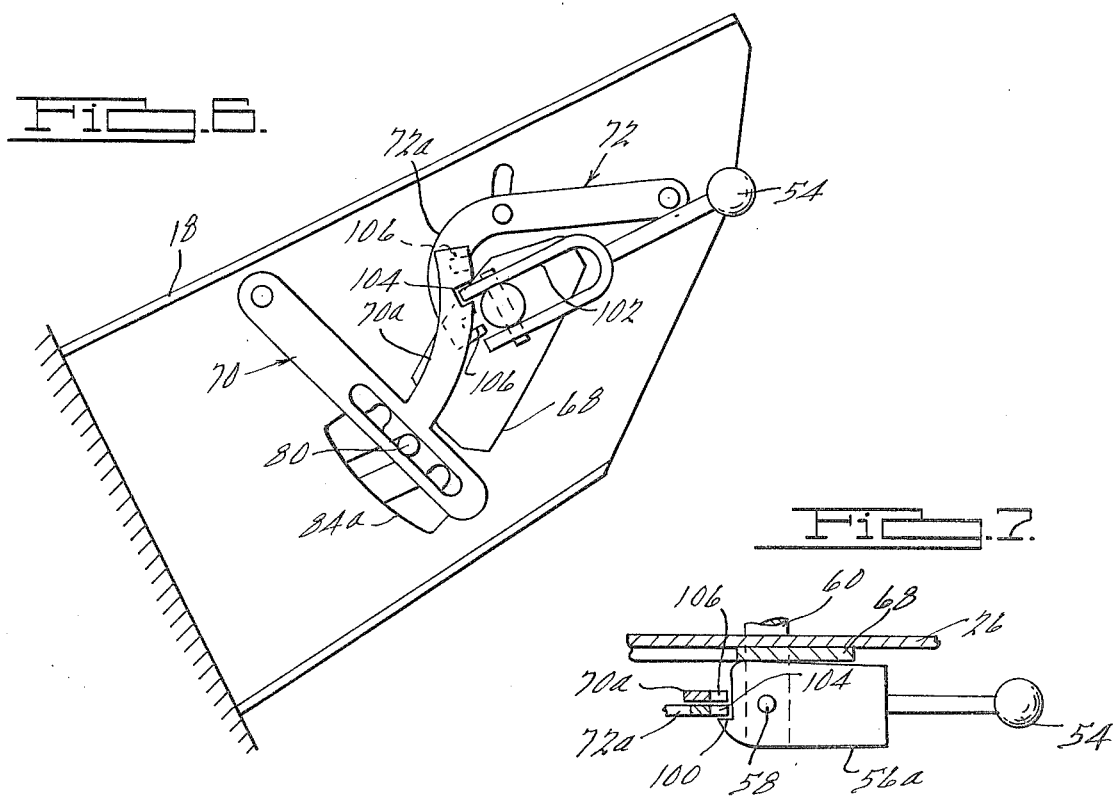

POSITIONING DEVICE FOR ADJUSTABLE STEERING COLUMNS

BACKGROUND OF THE INVENTION

1. Field of Invention

The invention relates to positioning devices for vehicle steering columns moveable translationally and pivotally.

2. Description of the Prior Art

The need to translationally and pivotally position vehicle steering columns, particularly in commercial vehicles, to provide for the comfort of drivers of various sizes in various seat positions is met in the prior art by devices which disadvantageously use a plurality of moving elements secured to the column. See, e.g., U.S. Pat. No. 3,580,101 to Jorgenson. Prior art devices exhibit a further disadvantage in that their complexity tends to result in cumulative manufacturing tolerances creating a looseness in the assembly. Such devices necessitate the use of a plurality of parts to guide the movement of the moveable members and to secure them in selected positions. This proliferation of parts adversely effects the complexity, cost and reliability of the devices.

SUMMARY OF THE INVENTION

In view of the state of the prior art it is the principle object of the present invention to provide a positioning device jfor a vehicle steering column which minimizes the number of moving members secured to the column for effecting translational and pivotal movement of the column.

It is a further object to provide a positioning device which employs a single moveable member attached to the column to independently effect translational and pivotal movement.

It is a still further object to provide a positioning device which minimizes the number and complexity of parts used to secure the moveable member in selected translational or pivotal positions.

It is an even further object to provide means for locking the device in selected positions in a manner overcoming the effects of manufacturing tolerances and creating a stiff assembly.

According to one feature of the invention positioning device a single sliding member is fixed to the steering column and is slidably received in a fixed support member to allow selective translational and pivotal movement.

According to another feature the slider member slidingly engages a fixed guide member and a guide member pivotally moveable with respect to the fixed guide member to provide independent translational and pivotal movement of the slider member.

According to still another feature a single element is used to disable both the means for latching the slider member in a selected translational position and the means for locking the slider member in a selected pivotal position thereby minimizing the number of components employed to serve these purposes.

According to yet another feature the single element employed to disable the latching means is further employed to create a locking force between the slider and support members thereby creating a stiff assembly.

BRIEF DESCRIPTION OF THE DRAWINGS

FIG. 1 is a front elevational view of the positioning device of the present invention installed with a vehicle steering column.

FIG. 2 is an enlarged front elevational view.

FIG. 3 is a rear elevational view.

FIG. 4 is a fragmentary cross sectional view taken along line 4—4 of FIG. 2.

FIG. 5 is a fragmentary cross-sectional view of an alternative control lever embodiment.

FIG. 6 is a partial front elevaional view of another alternative embodiment.

FIG. 7 is a partial cross-sectional view of the alternative embodiment of FIG. 6.

DESCRIPTION OF THE PREFERRED EMBODIMENT

Referring now to FIG. 1, the positioning device 10 is illustrated as being fastened by means of a bolted clamp 12 to a steering column 14 which is universally mounted as schematically illustrated at 16 to the steering gear (not shown) of a vehicle. The positioning device 10 includes a support member 18 fixedly secured to the vehicle body, a slider member 20 received in the support member and fixedly secured to the clamp 12 by fasteners 13, and a control lever assembly 22 operative to permit selective translational and pivotal movement of the slider member 20 in a manner to be described in detail below.

Referring now to FIGS. 2, 3, and 4, the support member 18 is illustrated as comprising a pair of side plates 24 and 26 preferably formed as sheet metal stampings and arranged in a spaced parallel relationship by their attachment to a pair of spacer bars 28. So positioned the slide plates 24 and 26 define a space 30 for receiving the slider member 20. Two pairs of antifriction pads 32 and 34 formed from a suitable antifriction material such as that manufactured and sold under the name of Super Dylan by the Dylan Corporation are bonded to the inner surfaces 36 and 38 of side plates 24 and 26, respectively, proximate the free ends of the said plates as may best be seen in FIGS. 2 and 3. Also disposed between inner surfaces 36 and 38 and the slider member 20 are pairs of locking projections 40 and 42 whose use will be hereinafter described. These may be formed as metallic washers or the like and welded to the side plates or may be carried loosely by the control assembly 22 or they may be integrally formed with the side plates themselves as by stamping. They are positioned proximate the center of the control assembly 22 as may best be seen in FIG. 2.

The slider member 20, as shown in FIG. 3, is illustrated as comprising an elongated bar having transversely formed therethrough upper and lower elongated slots 44 and 46, respectively, extending parallel to its axis of the elongation. A central aperture 48 is formed through the slider member 20 and a plurality of axially spaced, arcuately shaped notches are formed on the upper edge of the slider member 20 as illustrated in FIGS. 1 – 3. Also included with the slider member 20 are a pair of antifriction pads 52 formed of the material of pads 32 and 34 and bonded proximate the inboard end of the slider member 20 as may be seen in FIG. 3.

The control lever assembly 22 is illustrated in FIGS. 2–4 as comprising an actuating control handle 54, which is fixedly secured to a locking cam member 56, which is in turn fixedly mounted by means of pin connection 58 to a shaft 60 extending transversely through the side plates 24 and 26, respectively, and passing through the aperture 48 formed in slider member 20. Axial retention of the shaft 60 is provided by an enlarged head portion 66. Fixedly secured to the shaft 60 for rotation therewith and interposed between the locking cam 56 and the side plate 26 is a release cam 68 shown in its inactive position in FIG. 2. The release cam 68 is configured to operatively engage a pivot control lever 70 and a translation control lever 72.

The pivotal control lever 70 includes a pair of arms 74a and 74b (as shown in FIGS. 2 and 3) which are operatively connected to each other and pivotally mounted on the support member 18 by means of a pin 76 extending transversely to the side plates 24 and 26. Each arm 74a and 74b includes an elongated slot 78a and 78b formed proximate the free end thereof which slidingly receives and axially retains a floating guide pin 80, which also is slidingly engaged in the lower slot 46 of slider member 20. Arms 74a and 74b may, of course, be formed together.

The guide pin 80 is sized for engagement with any of a plurality of notches 82 formed on one edge of aligned apertures, 84a and 84b proximate the free end of the assembly. It will be clear to those skilled in the art that design modifications could be made which would reposition the notches 82 in other locations without affecting their function to be hereinafter described. It will likewise be clear that the generally sinusoidal shape of the notches 82 may be changed to a configuration presenting sides parallel to the slot 46 for retaining the pin 80 if forces on the pin 80 tend to drive it out of the notch 82.

Translation control lever 72 likewise includes a pair of arms 86a and 86b which may be formed as a single U-shaped arm. The arms are operatively connected to each other and pivotally mounted to a second guide pin 88 which is secured to the side plates and extends traversely thereto slidingly engaging the upper slot 44 of slide member 20. A locking pin 90 is carried at the free end of the arms and fixedly connected to them. It extends through an aperture 92 formed in the side plates 24 and 26 and is configured to engage any of the plurality of arcuately shaped notches 50 formed on the upper edge of the slider member 20 as may best be seen in FIG. 3. An extension spring 94 is secured to the arms 74b and 86b and applies a biasing load to urge the pins 80 and 90 into latching engagement with their respective notches. It will be appreciated that individual biasing springs may alternatively be used to load the arms 74b and 86b in other arrangements of the control levers.

OPERATION OF THE PREFERRED EMBODIMENT

Translational movement of the steering column 14 is effected by extending slider member 20. This is accomplished by rotating the handle 54 counterclockwise as shown in FIG. 2 to place a surface 85 of the release cam 68 in abutment with the lower edge 87 of the arm 86a. This movement overcomes the biasing force of the spring 94 to pivot the arms 86a and 86b, disengaging the pin 90 from one of the arcuately shaped notches 50 of slider member 20. When in this position, the slider member 20 may be moved parallel to its longitudinal axis as guided by the sliding engagement of the fixed guide pin 88 in upper slot 44 and of floating guide pin 80 in the lower slot 46, the pin 80, of course, being biased into engagement with a notch 82 by action of the extension spring 94. When the slider member 20 is moved to a new position wherein the pivotal path of the pin 90 again registers with a notch 50, the handle 54 may be rotated to its original position, thereby allowing the biasing force of the spring 94 to urge the pin 90 into engagement in the new position.

Pivotal movement of the steering column 14 is accomplished by pivoting the slider member 20 about the fixed guide pin 88. To allow this motion, the handle 54 is rotated clockwise from the position shown in FIG. 2 until the surface 73 of release cam member 68 is in abutting engagement with the forward edge 75 of the arm 74a. This movement pivots the arms 74a and 74b about the pin 76, moving the pin 80 slidingly along the lower slot 46 of the slider member 20 and along the longitudinal slot 78 in the arms 74a and 74b. In this movement the biasing force of the extension spring 94 is overcome and the floating pin 80 is disengaged from the notch 82. When the pin 80 is free, the slider member 20 may be pivoted about the fixed guide pin 88 until the pin 80 again registers with a notch 82 at a point the handle 54 may be turned to its original position and the biasing force of the spring 94 returns the floating pin 80 into engagement.

As the operation has been described translational and pivotal movement of the steering column are effected independently and by separate adjustment features. the independence of the two modes of positioning movement is related, however, to the configuration of the aperture 58 formed through the slider member 20. The internal configuration of the driver's compartment of the vehicle may prevent complete independence of motion. For example, the position of the vehicle's dashboard may prevent the full leftward positioning of the steering column 14 when the column is moved to the pivotal position fully counterclockwise as shown in FIG. 1. To prevent adjustment to this position the inner surfaces 49 of the aperture 48 may be configured so that the position of the shaft 60 will prevent movement of the aperture 48 and hence the slider 20 into the undesired position.

When the steering column 14 is in a selected position, such as is shown in the drawings, its translational and pivotal movement is prevented by the engagement of the pins 80 and 90 and their respective notches. The necessary manufacturing tolerances in the components of the positioning device 10, however, yield a slight but possibly undesirable looseness in the assembly of the positioning device 10. In the preferred embodiment, this looseness is eliminated by the operation of the locking cam 56 as may best be seen in FIG. 4. Downward movement of the handle 54 from the position shown in FIG. 4 causes the locking cam 56 to exert an axial force transverse to the side plates 24 and 26, which are formed of a material having a thickness as to provide flexibility, by drawing the enlarged head 66 of the shaft 60 against the outer side 25 of plate 24. This draws the plates 24 and 26 toward one another and brings the pairs of locking members 40 and 42 into contact with the slider member 20, thereby providing firm transverse contact and eliminating the looseness in the assembly. Reversal of the motion of the handle 54 is, of course, required before readjustment of the position of the column 14 can be made.

DESCRIPTION OF ALTERNATE EMBODIMENTS

FIG. 5 illustrates an alternate means for applying the transverse locking force described above. In this embodiment the side plates 24a and 26a may be, but are not necessarily, formed of flexible material as in the preferred embodiment. The locking members 40 and 42 of the preferred embodiment are eliminated and and enlarged aperture 96 is formed about the axis of the shaft 60 and a thrust transferring element, such as a washer 98, is carried under the head 66 of the shaft 60. Moving the handle 54 clockwise as previously described draws the enlarged head portion 66 against the washer 98 to urge the slider member 20 against the inside surface 38a of the side plate 26a. This effects a reduction in looseness in the assembly similar to that effected in the preferred embodiment described above.

FIGS. 6 and 7 illustrate another alternative embodiment, including a means for controlling the transverse locking, whereby rotation of the handle 54 to create the transverse locking force is prevented unless the pin 80 is engaged in a notch 82 and the pin 90 is engaged in a notch 50. In this embodiment the pivot control lever 70 and the translation control lever 72 are modified to include lock control arms 70a and 72a. Each of these arms extends to pass between the locking cam 56a and the control cam 68. This interposition is accomplished by providing a notch 100 on the under surface of one tine 102 of the bifurcated locking cam member 56a as may best be seen in FIG. 7. The arm 70a includes a slot 104 positioned to be aligned with the tine 102 only when the pin 80 is engaged in one of the slots 82 and the arm 72a includes a plurality of slots which are positioned for alignment with the tine 102 only when the pin 90 is engaged. When so aligned clockwise rotation of the handle 54 is possible, thereby creating the transverse locking force. When not aligned rotation will be prevented. Although described here in only three embodiments, it will be clear that others are possible. For example, a device that affords only translational or pivotal movement can be constructed according to the teachings of the present invention.

What is claimed is:

1. A positioning device for use with a steering column in a vehicle, the steering column being adapted to be operatively connected to the steering gear of the vehicle in a manner allowing the steering column to be translatively and pivotally moveable in the plane of the steering column, the positioning device comprising:
    a support member adapted to be secured to the body of said vehicle;
    an elongated slider member adapted to be fixedly secured at one end to said column;
    means mounting said slider member on said support member for;
        selective pivotal movement in said steering column plane between a plurality of the tilt positions thereby effecting pivotal movement of said column;
        selective movement along its axis between a plurality of translational positions in each of said tilt positions thereby effecting translational movement of said column;
    tilt latching means for holding said slider member in any of said tilt positions; and
    translation latching means for holding said slider member in any of said translational positions.

2. The positioning device as defined in claim 1 wherein said tilt latching means and said translational latching means are pivotally mounted for movement between respective locked and open positions and including biasing means operatively connected to both of said latching means to simultaneously urge said latching means into said locked positions.

3. The positioning device as defined in claim 1 wherein said tilt positions comprise a plurality of discrete tilt positions and said translational positions comprise a plurality of discrete translational positions and wherein said positioning device further comprises means for preventing movement of said slider member to at least one of said discrete translational positions when said slider member is in at least one of said discrete tilt positions.

4. The positioning device as defined in claim 1 and further comprising latch release moveable from an inoperative position to a first position operative to release said tilt latching means, thereby permitting tilting of said slider member, or to a second position operative to release said translation latching means, thereby permitting axial movement of said slider member.

5. The positioning device as defined in claim 4 and further comprising actuator means for operating said latch release means, said actuator means being further operative to create a locking force acting perpendicular to said steering column plane between said support member and said slider member.

6. The positioning device as defined in claim 5 wherein said tilt positions comprise a plurality of discrete tilt positions and said translational positions comprise a plurality of discrete translational positions and wherein said positioning device further comprises means for preventing the creation of said locking force when said slider member is moved to a tilt position other than one of said discrete tilt positions or to a translational position other than one of said discrete translational positions.

7. A positioning device for use with a steering column in a vehicle, said steering column being operatively connected to the steering gear of the vehicle in a manner allowing said steering column to be translatively and pivotally moveable in the plane of said steering column, the positioning device comprising:
    a support member having first and second side plates adapted for attaching to said vehicle, and including means maintaining said plate in parallel, spaced relation;
    an elongated slider member adapted to be fixedly secured at one end to said column and slidingly received between said plates; and
    means for positioning said slider member for:
        selective pivotal movement in said steering column plane between a plurality of discrete tilt positions, thereby effecting pivotal movement of said column; and
        selective movement along its longitudinal axis between a plurality of discrete axial positions in each of its tilt positions, thereby effecting translational movement of said column.

8. The positioning device as defined in claim 7 wherein said means for positioning said slider member for selective movement along its axis comprises:
    slot means formed through said slider member and extending parallel to the axis of said slider member; and
    first and second guide members secured to said support member and slidingly engaging said slot means.

9. The positioning device as defined in claim 8 wherein said first guide member is fixedly secured to said side plates and extends therebetween and wherein said means for positioning said slider member for pivotal movement comprises means operative to permit movement of said second guide member rotatively with respect to said first guide member thereby effecting pivotal movement of said slider member.

10. The positioning device as defined in claim 8 wherein said means for positioning further comprises translation control means including:
  translation control lever means mounted at one end for pivotal movement with respect to said support member and including a pin mounted at its other end and extending transverse to the longitudinal axis of said slider member,
  a slot formed through said plates for receiving said pin and permitting pivotal displacement thereof,
  a plurality of axially spaced, arcuately shaped notches formed on one longitudinal edge of said slider member and registerable with said slot;
  means for biasing said translation control lever pin into engagement with any of said notches when said any notch is axially positioned to register with said slot.

11. The positioning device as defined in claim 10 wherein said means for positioning further comprises tilt control means including:
  tilt control lever means pivotally mounted on said support member and having a radially extending slot formed therethrough, said slot slidingly receiving said second guide member; and
  an aperture formed through said plates and having a plurality of notches formed on one edge thereof; and
  means for biasing said tilt control lever means to urge said second guide member into engagement with one of said aperture notches when said guide member is aligned with any of said aperture notches.

12. The positioning device as defined in claim 11 wherein said translation biasing means and said tilt biasing means comprise an extension spring operatively connected to said translation control lever and said tilt control lever.

13. The positioning device as defined in claim 11 wherein said means for positioning further comprises release means operative in one condition to pivot said translation control lever means against the force of said translation biasing means to disengage said pin from said slider member notch and in another condition to pivot said tilt control lever means against the force of tilt biasing means to disengage said second guide member from said aperture notch.

14. The positioning device as defined in claim 13 wherein said release means comprises an actuating handle mounted for rotation with a shaft member rotatably mounted transverse to said plates, and a control cam member positioned to abut the outer surface of one of said side plates and rotatable with said shaft from an inoperative position to a first position wherein said control cam member engages said tilt control lever means thereby pivoting it to overcome said tilt biasing means and to a second position wherein said control cam member engages said translation control lever means thereby pivoting it to overcome said translation biasing means.

15. The positioning device as defined in claim 14 wherein said release means further comprises a locking cam member fixed to said handle, carried on said shaft member, and rotatable perpendicularly with respect to said control cam member from a free position to a loaded position contacting said control cam member whereby a transverse locking force is created between said plates and said slider member tending to urge said plates into contact with said slider member.

16. The positioning device as defined in claim 14 wherein said release means further comprises:
  an aperture formed in one of said side plates about said shaft member;
  a thrust transferring element carried on said shaft member and adapted to be received in said side aperture;
  a locking cam member carried on said shaft member and rotatable perpendicularly with respect to said control cam member from a free position to a loaded position contacting said control cam member and moving said shaft member to create a transverse locking force between said thrust transferring element, the slider member, and the other of said side plates.

17. The positioning device as defined in claim 15 and further comprising lock control means carried with said tilt control lever means and said translation control lever means disposed between said control cam member and said locking cam member, and operative to prevent movement of said locking cam member to said loaded position when said second guide member is disengaged from said aperture notches and/or when said translation control lever pin is disengaged from said slider member notches.

18. The positioning device as defined in claim 17 wherein said lock control means comprises:
  a notch formed on the surface of said locking cam member;
  a pair of lock control arms extending from said pivot control lever and said translation control lever to pass between said control cam member and said locking cam member and registering with said notch;
  a slot for receiving said locking cam member formed through said pivot lock control arm, positioned to register with said locking cam member when said second guide member is engaged in said side plate aperture notch; and
  a plurality of slots for receiving locking cam member formed through said translation lock control arm positioned to register with said locking cam member when said pin is engaged in a corresponding slider member notch,
  whereby rotation of said locking cam member to create said transverse locking force is prevented unless said pivot arm slot and one of said translation arm slots is aligned with said locking cam member.

* * * * *

UNITED STATES PATENT AND TRADEMARK OFFICE
CERTIFICATE OF CORRECTION

PATENT NO. : 4,018,101
DATED : April 19, 1977
INVENTOR(S) : William T. Mihalic

It is certified that error appears in the above-identified patent and that said Letters Patent are hereby corrected as shown below:

Col. 1, line 31:    "jfor" should read---for---.

Col. 2, Fig. 6:    "elevaional" should read---elevational---.

Col. 4, line 21:    "a" (second occurrence) should read---which---.

line 30:    "58" should read "48".

Claim 4, line 2:    After "release" insert---means---.

Claim 18, line 15:    after "receiving" insert---said---.

Signed and Sealed this fifth Day of July 1977

[SEAL]

Attest:

RUTH C. MASON
*Attesting Officer*

C. MARSHALL DANN
*Commissioner of Patents and Trademarks*